US007742188B2

(12) United States Patent
Ito et al.

(10) Patent No.: US 7,742,188 B2
(45) Date of Patent: Jun. 22, 2010

(54) IMAGE FORMING APPARATUS AND METHOD

(75) Inventors: Katsuyuki Ito, Tokyo (JP); Taku Kimura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 723 days.

(21) Appl. No.: 11/039,593

(22) Filed: Jan. 19, 2005

(65) Prior Publication Data

US 2005/0169650 A1 Aug. 4, 2005

(30) Foreign Application Priority Data

Jan. 20, 2004 (JP) ............................. 2004-011566

(51) Int. Cl.
*G06K 15/00* (2006.01)

(52) U.S. Cl. ........................ 358/1.18; 358/1.1; 358/1.9; 358/1.12; 358/1.13; 358/1.14; 358/1.15; 358/1.16; 399/45; 399/53; 250/559.26; 250/559.27; 250/559.36; 347/14

(58) Field of Classification Search .................. 358/1.2, 358/1.8, 1.12, 1.16, 3.03, 3.12, 450, 1.18; 347/5, 188; 399/45, 323, 325, 328; 400/120.09
See application file for complete search history.

(56) References Cited

U.S. PATENT DOCUMENTS 4,919,410 A * 4/1990 Robinson et al. .............. 399/45
5,486,903 A * 1/1996 Kanno et al. .................. 399/45
6,028,318 A * 2/2000 Cornelius .............. 250/559.27
6,408,750 B1 * 6/2002 Goto et al. .................. 101/226
6,718,872 B2 * 4/2004 Kanno ........................ 101/118
6,757,071 B1 * 6/2004 Goodman et al. .......... 358/1.13
6,776,543 B1 * 8/2004 Hall et al. ...................... 400/56
6,895,195 B2 * 5/2005 Katamoto .................... 399/45
2002/0015167 A1 * 2/2002 Watanabe et al. .......... 358/1.11
2002/0057302 A1 * 5/2002 Shimomura et al. ............ 347/8
2003/0077099 A1 * 4/2003 Tanaka et al. ............ 400/615.2
2003/0118384 A1 * 6/2003 Moriyama .................. 399/382
2004/0008979 A1 * 1/2004 Eskey ......................... 392/417
2004/0075708 A1 * 4/2004 Arakawa ..................... 347/19

(Continued)

FOREIGN PATENT DOCUMENTS

EP 1293349 A2 * 3/2003

(Continued)

OTHER PUBLICATIONS

Business Info, HP edges closer (Edgeline MFP), May 17, 2007, Solutions Business Publishing, UK, 2007024, No. 82, p. 27.*

(Continued)

*Primary Examiner*—Mark K Zimmerman
*Assistant Examiner*—Miya J Cato
(74) *Attorney, Agent, or Firm*—Panitch Schwarze Belisario & Nadel LLP

(57) ABSTRACT

An electrophotographic image forming apparatus fuses an image to a recording medium by heat and pressure. To ensure that the recording medium does not stick to the fusing roller, a non-printable margin is normally reserved at the leading edge of the recording medium. When the recording medium has sufficient stiffness, however, as determined from its thickness and other factors such as its width or orientation, marginless printing is permitted. The setting of an unnecessary margin is thereby avoided.

19 Claims, 8 Drawing Sheets

U.S. PATENT DOCUMENTS

| | | | | |
|---|---|---|---|---|
| 2004/0146322 | A1* | 7/2004 | Lee | 399/323 |
| 2006/0170720 | A1* | 8/2006 | Akase et al. | 347/14 |

FOREIGN PATENT DOCUMENTS

| | | | |
|---|---|---|---|
| EP | 1667424 | A2 * | 6/2006 |
| JP | 11-338306 | A | 12/1999 |
| JP | 2000-047515 | A | 2/2000 |
| JP | 2004-005559 | A | 1/2004 |

OTHER PUBLICATIONS

Lexmark and Lexmark with diamond design, Lexmark C760-C762 User's Guide, Jun. 2004, Lexmark International, Inc, pp. 38-41.*

* cited by examiner

FIG.6

44

| MEDIA THICKNESS | MEDIA SIZE AND ORIENTATION | |
|---|---|---|
| | A4 SEF OR A5 LEF | A4 LEF OR A3 SEF |
| $80\mu m$ | NG | NG |
| $100\mu m$ | OK | NG |
| $120\mu m$ | OK | NG |
| $140\mu m$ | OK | OK |

IMAGE FORMING APPARATUS AND METHOD

BACKGROUND OF THE INVENTION

1. Field of the Invention

The present invention relates to the margin at the leading edge of a recording medium on which an image is printed by an electrophotographic apparatus such as a copier, printer, or facsimile machine.

2. Description of the Related Art

In conventional electrophotographic printing apparatus, an image formed with a developing agent such as toner is transferred to a recording medium such as a sheet of paper, which is then passed between a fusing roller and a pressure roller that fuse the image onto the recording medium by a combination of heat and pressure. Since heating increases the adhesiveness of the developing agent, the recording medium has a tendency to stick to the fusing roller and must be separated therefrom by a claw or some other type of separator.

The separator must not make contact with the surface of the fusing roller, lest it damage the surface, so a gap is left between the separator and the fusing roller. As the recording medium approaches the separator, accordingly, the leading edge of the recording medium must separate naturally from the fusing roller so that it can engage the separator. A certain margin of space must therefore be left free of developing agent at the leading edge of the recording medium. This causes a problem when the image to be printed extends into the margin.

The necessary length of the margin as measured from the leading edge of the recording medium in the direction of travel of the recording medium is related to the density of the developing agent on the recording medium, which depends both on the content of the image and the type of image processing apparatus. The density is higher in color image forming apparatus, in which toner developing agents of different colors are superimposed on the recording medium, than in a monochrome printer. The higher the density of the recording agent, the more the recording media tend to stick to the fusing roller. In color image forming apparatus the necessary length of the non-printable margin at the leading edge of the recording medium is generally considered to be at least five millimeters (5 mm).

The user of the image forming apparatus would naturally prefer the non-printable margin to be as small as possible. A reduced margin, however, carries with it the risk that recording media will fail to separate from the fusing roller and will jam. Since this risk varies with the density of the developing agent near the margin, Japanese Unexamined Patent Application Number No. 2000-47515 discloses an image forming apparatus that switches from a relatively small margin to a larger margin when, for example, the developing agent density in the first centimeter, as measured from the leading edge, is greater than a predetermined threshold.

This prior art, however, fails to take cognizance of other factors that affect the risk of non-separation and jamming. In particular, thin recording media have a greater tendency to stick to the fusing roller than do thick recording media, because thick recording media are stiffer than thin recording media. The orientation of the media is also a factor: recording media transported long edge first have a greater tendency to stick to the fusing roller than recording media transported short edge first. Setting the non-printable margin solely according to the developing agent density leads to the setting of an unnecessarily large margin for thick recording media, and for recording media transported short edge first.

A further shortcoming of this prior art is that it always leaves at least a small non-printable margin, regardless of the density of the developing agent. Marginless printing, which is often desirable for photographic images and the like, is not possible.

SUMMARY OF THE INVENTION

An object of the present invention is to provide an image forming apparatus that can avoid the setting of an unnecessary non-printable margin at the leading edge of a recording medium.

The invention provides a method of forming an image on a recording medium by using an image forming apparatus having a print control section for receiving image data and generating image printing data, a media transport section for transporting the recording medium, an image forming section for forming an image according to the image printing data, a transfer section for transferring the image onto the recording medium, a fusing section for fusing the transferred image onto the recording medium, and a thickness detector for detecting the thickness of the recording medium.

The method includes determining, from the image printing data, whether there will be at least a predetermined amount of space without printing at the leading edge of the recording medium, and deciding, from the thickness of the recording medium, whether printing within the predetermined amount of space is possible. When printing is possible within the predetermined amount of space at the leading edge of the recording medium, the image printing data are sent to the image forming section even if the amount of space without printing at the leading edge of the recording medium is less than the predetermined amount.

When the amount of space without printing at the leading edge of the recording medium is less than the predetermined amount and printing is not possible within the predetermined amount of space at the leading edge of the recording medium, the print control section may retain the image printing data and eject the recording medium without forming an image. Alternatively, the print control section may modify the image printing data so as to increase the amount of space without printing at the leading edge of the recording medium to at least the predetermined amount, and send the modified image printing data to the image forming section.

The decision as to whether printing is possible within the predetermined amount of space at the leading edge of the recording medium may be based on a table of media thicknesses indicating printability for each thickness. The decision may also be based on the size and orientation of the recording medium, or on the width of the leading edge of the recording medium.

BRIEF DESCRIPTION OF THE DRAWINGS

In the attached drawings:

FIG. 6 illustrates exemplary contents of the decision table memory in FIG. 2;

DETAILED DESCRIPTION OF THE INVENTION

Figure 1:
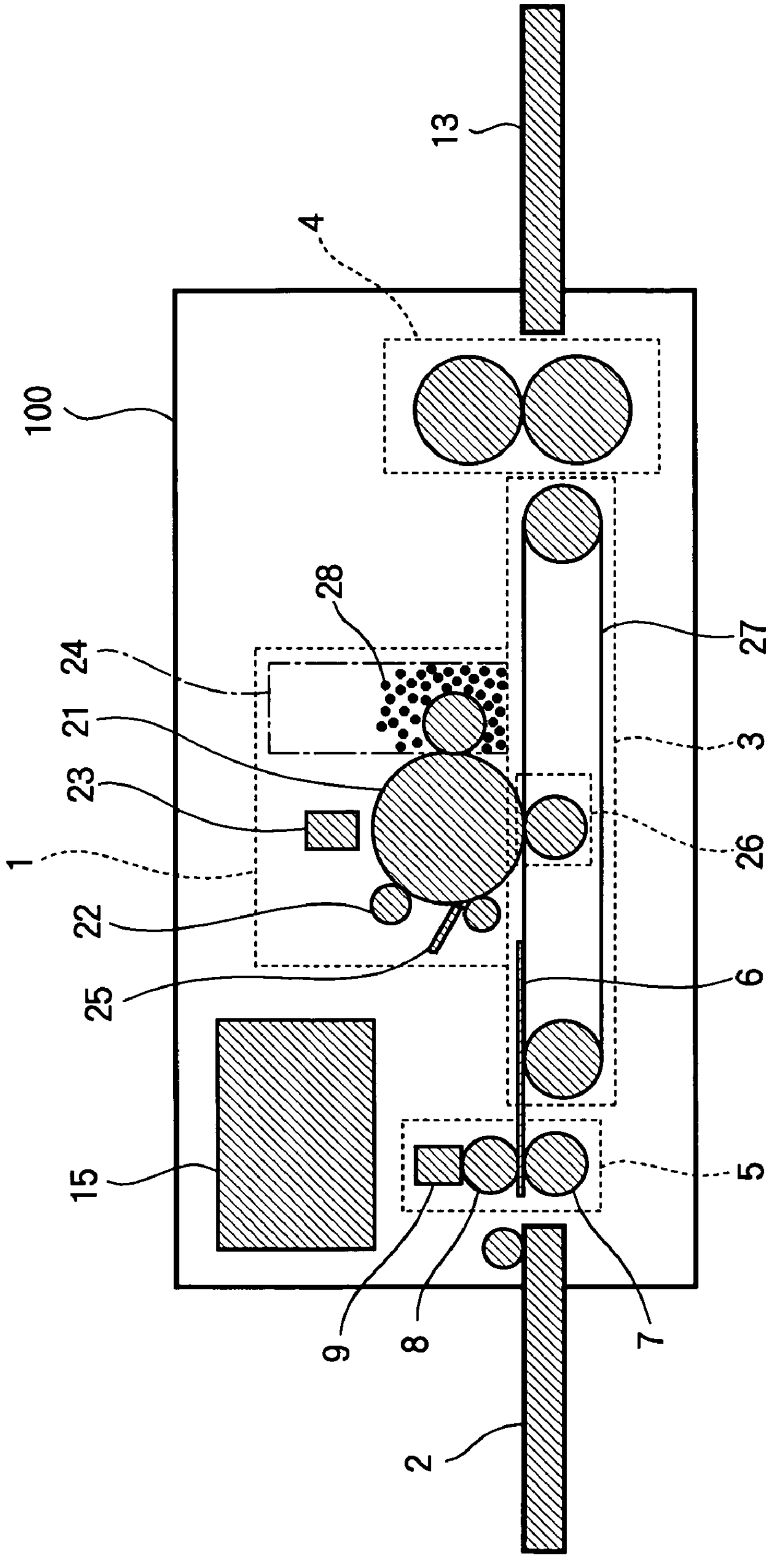
FIG. 1 is a side sectional view of an image forming apparatus according to a first embodiment of the invention.

Embodiments of the invention will now be described with reference to the attached drawings, in which like elements are indicated by like reference characters.

Referring to FIG. 1, the image forming apparatus 100 in a first embodiment of the invention comprises an image forming section 1, a media supply section 2, a transfer and transport section 3, a fusing section 4, a media transport section 5, a delivery tray 13, and a print control section 15.

The image forming section 1 comprises, for example, a photosensitive drum 21 surrounded by a charger 22, an exposure unit 23, a developing unit 24, and a cleaning blade 25, which cooperate to form an image on the photosensitive drum 21 according to image printing data received from the print control section 15. More specifically, the photosensitive drum 21 is charged by the charger 22 and exposed to light by the exposure unit 23 to form a latent electrostatic image, which is developed by the application of a developing agent (toner) 28 in the developing unit 24.

The media supply section 2 is a cassette or cartridge in which recording media (sheets of paper) are stacked and stored.

The media transport section 5 has a registration roller 7 and an idle roller 8. Both rollers have surfaces covered with a resilient material such as rubber. The media transport section 5 transports recording media fed from the media supply section 2 to the transfer and transport section 3. In this embodiment, the media transport section 5 includes a thickness detector 9 disposed above the idle roller 8 for detecting the thickness of the recording medium 6 by sensing the upward motion of the idle roller 8. The media transport section 5 will be described in further detail below with reference to FIG. 3.

The transfer and transport section 3 transports the recording medium 6 through a transfer unit 26 on, for example, a transport belt 27. The image formed by the developing agent in the image forming section 1 is transferred onto the recording medium 6 by a transfer roller in the transfer unit 26. The recording medium 6 carrying the transferred image is then transported to the fusing section 4.

The fusing section 4 fuses the image formed by the developing agent 28 to the recording medium 6 by applying heat and pressure, and then ejects the recording medium. The fusing section 4 will be described in further detail below with reference to FIG. 4.

The delivery tray 13 receives and stacks the ejected recording media 6 onto which images have been fused.

The print control section 15 converts image data received from an external device such as an information-processing device (not shown) to image printing data from which the image forming section 1 can form an image, and outputs the image printing data to the image forming section 1. The print control section 15 also controls the operation of the image forming section 1, media supply section 2, transfer and transport section 3, fusing section 4, and media transport section 5.

Figure 2:
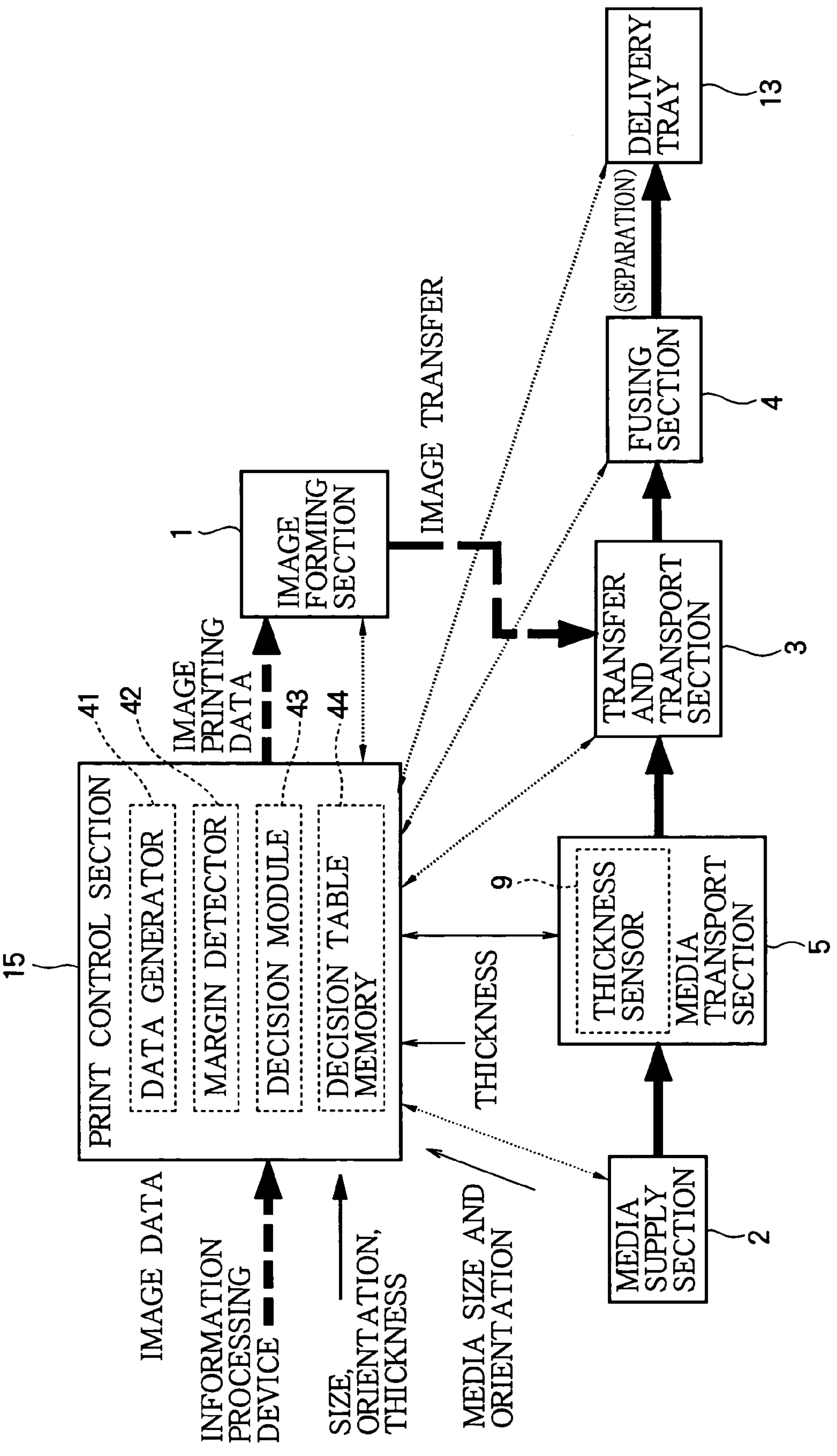
FIG. 2 is a block diagram schematically illustrating the structure of the image forming apparatus in FIG. 1 and indicating the flow of data between blocks.

Referring to FIG. 2, the print control section 15 comprises a data generator 41 for generating image printing data from the image data received from the external information processing device, a margin detector 42 for detecting from the image printing data the length of the non-printed area that will be left at the leading edge of the recording medium 6 in its direction of travel, a decision module 43 for determining, from the thickness detected by the thickness detector 9 and other information concerning the recording medium, whether to permit printing in a predetermined margin at the leading edge of the recording medium 6, and a decision table memory 44 storing a table indicating whether printing is permissible in the margins of recording media of various dimensions and orientations. This table is used by the decision module 43.

The leading edge of the printing medium 6 is the front edge as the printing medium is transported through the image forming section 1 and fusing section 4. The length of the non-printed area at the leading edge is the length parallel to the direction of travel, that is, the distance from the leading edge to the first printed part of the image.

When the print control section 15 receives image data, it receives accompanying information indicating, for example, the intended size of the recording media (e.g., A4, B4, etc.), the printing orientation (portrait or landscape), and the intended type of media (e.g., thick paper, overhead projector film, etc.) if any special type is intended. The print control section 15 also receives information about the recording media stored in the media supply section 2, including the size (A4, B4, etc.) of the media and the orientation of the media in the media supply section 2. This orientation determines whether the recording medium will be transported short edge first or long edge first. In addition, the print control section 15 receives information giving the thickness of the recording medium detected by the thickness detector 9.

Figure 3:
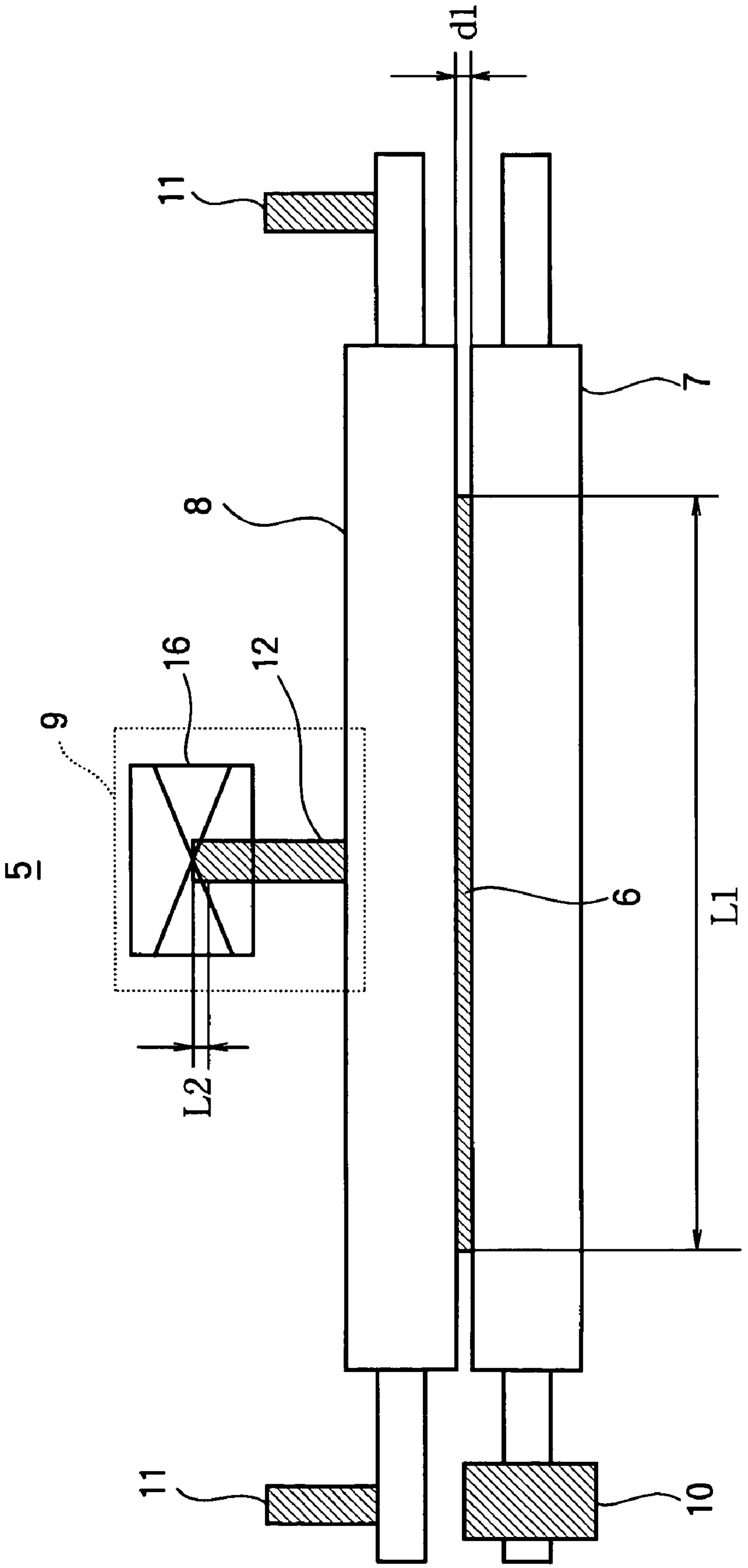
FIG. 3 is an enlarged frontal view of the media transport section in FIG. 1 as seen from the media supply section.

Referring now to FIG. 3, the media transport section 5 includes a rotary driving gear 10 mounted on the shaft of the registration roller 7 and driven by a driving mechanism (not shown) in the image forming apparatus. Springs 11 disposed at both ends of the shaft of the idle roller 8 press the idle roller shaft down onto fixed bearings (not shown) in the image forming apparatus.

The thickness detector 9 has a lever 12 with one end resting on the idle roller 8, and an optical position detector 16 including a light emitting device and a light receiving device for optically detecting the motion of the lever 12. When a recording medium 6, which has a width dimension L1 in the direction orthogonal to the direction of travel and a thickness d1, passes between the registration roller and the idle roller, the lever 12 is lifted through a distance L2, which is detected by the optical position detector 16. The amount of motion of the lever 12 varies according to the thickness d1 of the recording medium 6, so the thickness d1 of the recording medium 6 can be determined from the distance L2. Because the registration roller 7 is covered with a resilient material such as rubber, the amount of lift of the idle roller 8 is not necessarily equal to the thickness d1 of the recording medium 6.

Figure 4:
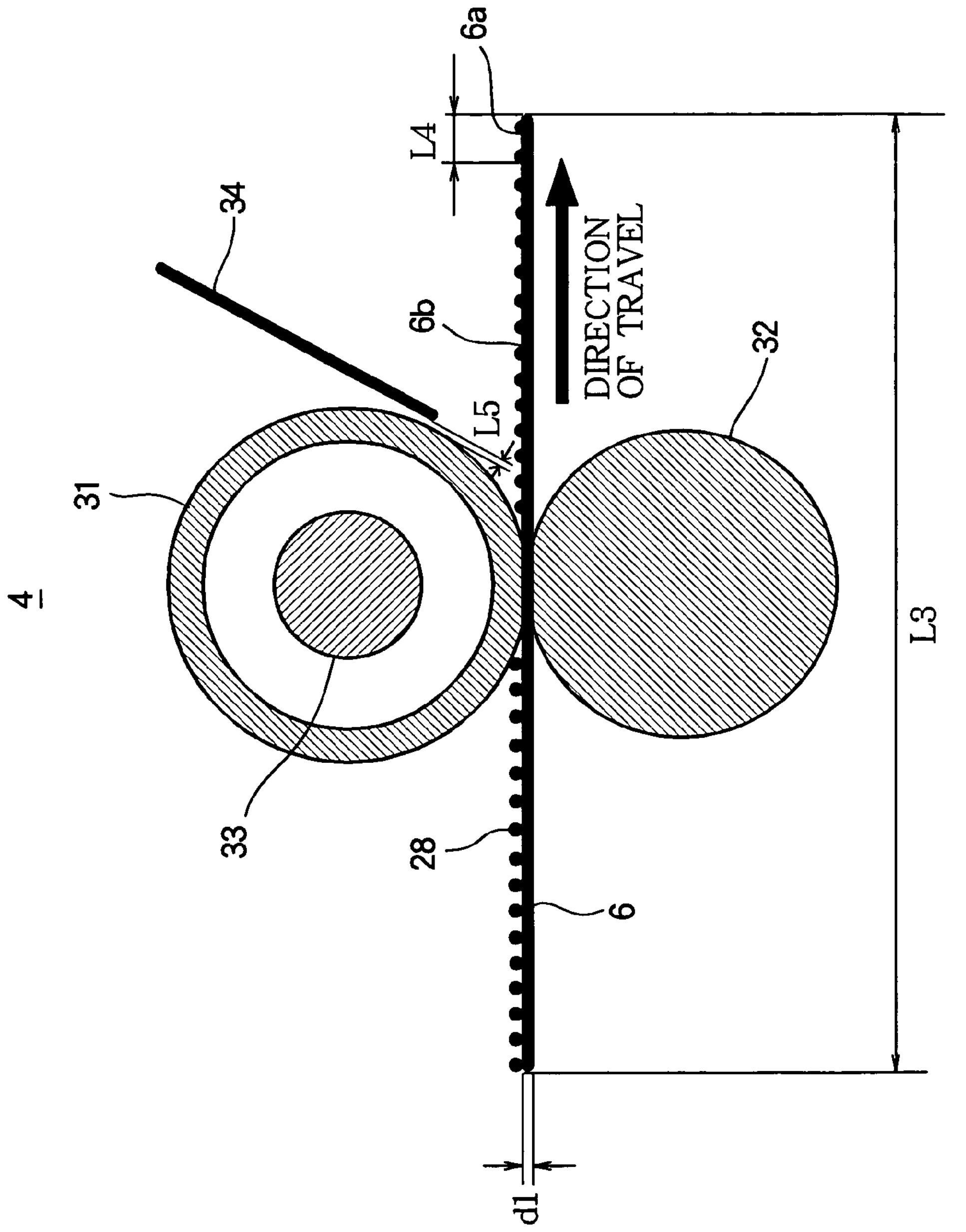
FIG. 4 is an enlarged sectional view schematically illustrating the fusing section in FIG. 1.

Referring to FIG. 4, in the fusing section 4, the fusing roller 31 and the pressure roller 32 are normally in mutual contact. The recording medium 6, which has a length dimension L3 in its direction of travel and a thickness d1, insinuates itself between the fusing roller 31 and the pressure roller 32 at their point of contact. A heater 33 is disposed inside the fusing roller 31. Springs (not shown) disposed at both ends of the shaft of the pressure roller 32 urge the pressure roller 32 toward the fusing roller 31. A rotary driving gear (not shown) mounted on the shaft (not shown) of the fusing roller 31 is driven by a driving mechanism (not shown) in the image forming apparatus. The image formed by the developing agent 28 and transferred to the recording medium 6 is fused onto the recording medium 6 by a combination of heat and pressure when the recording medium 6 passes between the two rollers 31, 32.

A separator 34 is provided for separating the recording medium 6 from the fusing roller 31 in case the recording medium 6 sticks to the fusing roller 31. A slight gap L5 is left between the separator 34 and the fusing roller 31 in order to avoid contact between them. As the recording medium 6 emerges from between the rollers 31, 32, its leading edge must separate naturally from the fusing roller by a distance greater than the gap L5 before the leading edge encounters the separator 34; otherwise, the separator 34 cannot separate the rest of the recording medium 6 from the fusing roller 31.

In order for the leading edge of the recording medium 6 to separate from the fusing roller 31 by a distance greater than the slight gap L5 between the fusing roller 31 and the separator 34, it may be necessary to provide a non-printed margin 6*a* at the leading edge of the recording medium 6 with a length L4 equal to or greater than a predetermined length in the direction of travel of the recording medium 6, even though this may decrease the printable area 6*b* of the recording medium. For example, in conventional color image forming apparatus, when the density of the developing agent is high and the stiffness of the recording medium 6 is low, a non-printable margin 6*a* having a length L4 of 5 mm or more is provided at the leading edge of the recording medium 6, as mentioned above.

If the recording medium 6 is stiff enough to separate from the fusing roller 31 even though developing agent is present at or near the leading edge, however, the non-printable margin 6*a* of length L4 can be dispensed with, enabling the entire surface of the recording medium to be printed on. Marginless printing is then possible.

Figure 5B:
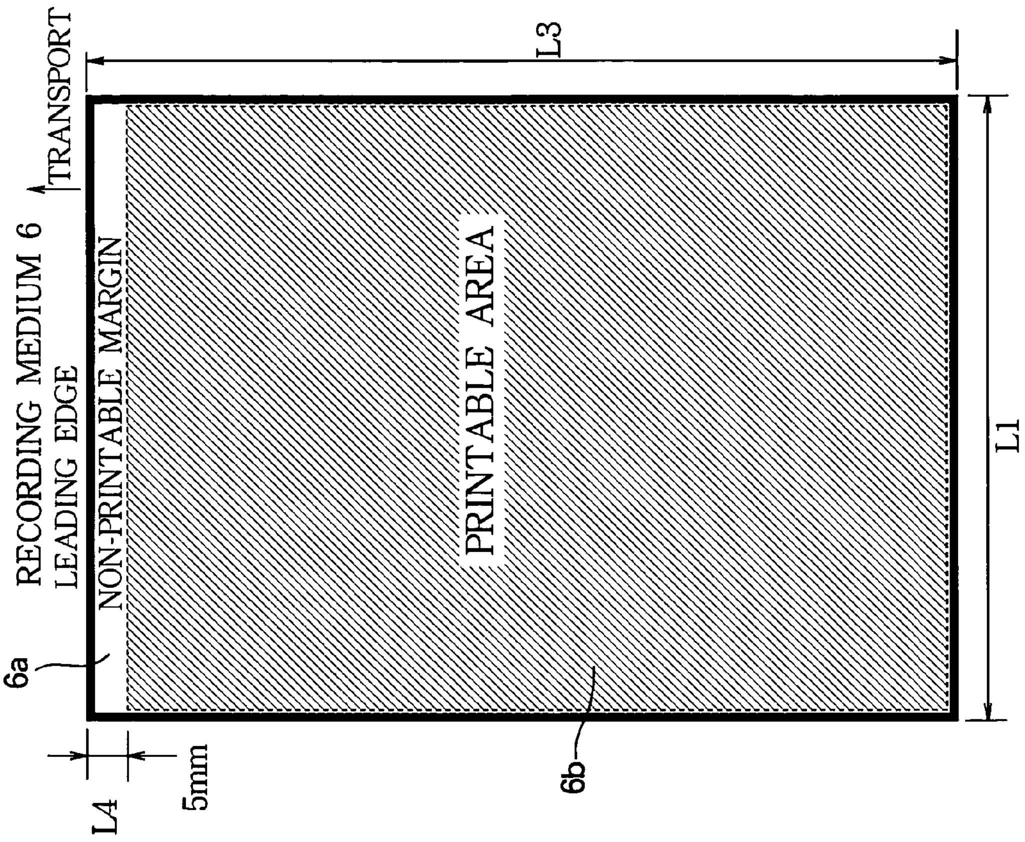
FIG. 5B illustrates a recording medium with a non-printable margin.
Figure 5A:
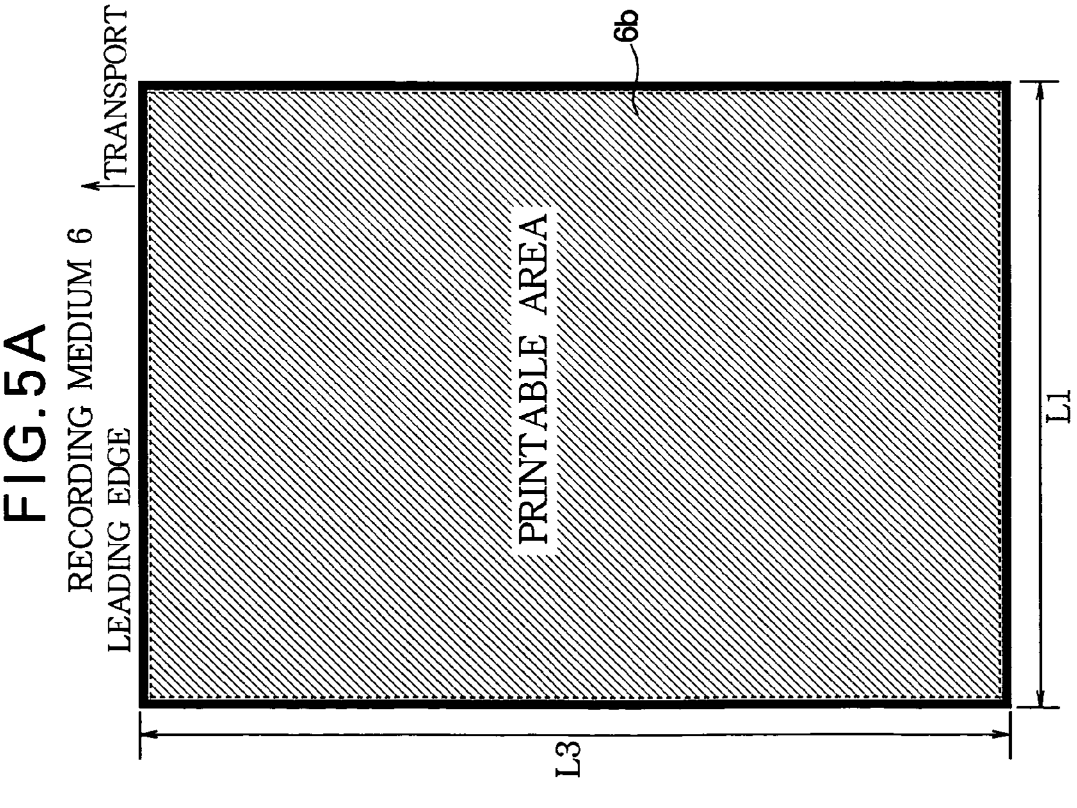
FIG. 5A illustrates a recording medium without a non-printable margin.

FIGS. 5A and 5B illustrate the non-printable margin 6*a* and the printable area 6*b* on the recording medium 6 in FIG. 4. FIG. 5A shows a case in which the printable area 6*b* occupies the whole surface of the recording medium 6. FIG. 5B shows a case in which there is a non-printable margin 6*a* with a predetermined length dimension L4.

Whether the non-printable margin 6*a* is necessary or not depends on the stiffness of the recording medium 6. The stiffness in turn depends on the thickness d1 of the recording medium, the material of which the recording medium is made, and ambient conditions such as temperature and humidity. Furthermore, the effective stiffness of the recording medium 6 is higher when the recording medium 6 is transported short edge first than when it is transported long edge first. That is, the recording medium separates from the fusing roller 31 more easily when transported short edge (L1) first, as shown in FIG. 5, than when the recording medium is transported long edge (L3) first.

If ambient conditions and the material of which the recording medium is made are ignored, the stiffness of the recording medium depends on its thickness and its width parallel to the leading edge, that is, its width in the direction orthogonal to the direction of travel. In the first embodiment, the necessity of a non-printable margin is determined from these two factors.

When the recording medium 6 is stiff enough to separate from the fusing roller 31 on its own, the non-printable margin 6*a* of dimension L4 can be dispensed with entirely and no problems occur, even if the image printing data call for printing to extend to the leading edge of the recording medium. Conversely, if the image printing data provide an adequate non-printed margin at the leading edge, no problem will occur, regardless of the stiffness or otherwise of the recording medium. However, when the recording medium 6 does not have enough stiffness to separate from the fusing roller 31 by itself, and the image printing data do not provide the necessary non-printed margin 6*a*, either the image printing data need to be modified to provide a non-printed margin of the necessary length L4 (for example 5 mm) at the leading edge of the recording medium 6, or image formation must be suspended to avoid the risk of a jam. In the first embodiment, image formation is suspended.

FIG. 6 illustrates an exemplary table stored in the decision table memory 44 in FIG. 2.

This table is based on the results of tests of whether particular recording media separate from the fusing roller 31 when the dimension of the non-printed margin is 0 mm, i.e., the entire surface of the recording medium is printed on, and the transferred image has the maximum possible density of developing agent at the leading edge of the recording medium.

The table in FIG. 6 shows the results of tests conducted on an image forming apparatus which can transport sheets of A3 paper short edge first (SEF), sheets of A4 paper either short edge first or long edge first (LEF), and sheets of A5 paper long edge first. A sheet of A4 paper transported short edge first has the same width, orthogonal to the direction of travel, as a sheet of A5 paper transported long edge first, so if both sheets have the same thickness and other factors are equal, the stiffness of both sheets is the same. Similarly, a sheet of A4 paper transported long edge first has the same stiffness as a sheet of A3 paper transported short edge first.

More generally, when any two sheets of paper have the same width parallel to their leading edges, they can be treated as having the same stiffness, provided their thickness and other factors are equal. If an image processing apparatus is limited to transporting A4 recording media short edge first and A5 media long edge first, for example, then whether or not a non-printed margin of a predetermined length is necessary at the leading edge of the recording media 6 can be determined based only on the thickness of the recording medium.

The table in FIG. 6 includes one set of data for A4 media transported short edge first and A5 media transported long edge first, and another set of data for A3 media transported short edge first and A4 media transported long edge first. The data indicate the printability of the area at the leading edge of media with thicknesses of 80 μm, 100 μm, 120 μm, and 140 μm, the thickness increasing in 20-μm increments: OK indicates that printing is allowable up to the leading edge; NG indicates that a non-printed margin must be left.

Next, the operation of the apparatus will be described according to the flowchart in FIG. 7, with reference also to FIG. 6.

In the first step (S1), the print control section 15 of the image forming apparatus 100 receives image data from the external information processing device, together with recording media information giving the intended dimensions and orientation of the recording media. The data generator 41 in the print control section 15 generates image printing data for the first page to be printed.

From the image printing data and recording media information, the margin detector 42 detects the non-printed area (if any) that will be left at the leading edge of the recording medium (S2).

The decision module 43 acquires the recording media information that was received with the image printing data, information as to the non-printed area detected by the margin detector 42, and information as to the size and orientation of the actual recording media stored in the media supply section 2 (S3). When the first sheet of recording media 6 is fed from the media supply section 2, the thickness detector 9 detects its thickness and the decision module 43 also acquires this information (S4). The acquired information is stored in a memory (not shown).

The decision module 43 now decides whether or not the non-printed area at the leading edge of the recording medium will have at least a predetermined length (S5). In the present embodiment, the predetermined length is 5 mm, which allows for separation of the recording medium from the fusing roller even with the maximum density of developing agent near the leading edge. If the length of the non-printed area is 5 mm or more (S5: No), printing is possible regardless of the density of the developing agent, so that the process proceeds to step S7 for printing. If the size of the non-printed area is less than 5 mm (S5: Yes), the process proceeds to step S6 to determine the possibility of printing out to the leading edge.

In step S6, the decision module 43 compares the detected thickness of the recording medium with the data in the decision table memory 44 (FIG. 6) to decide whether or not printing can be allowed in the first five millimeters at the leading edge, based on both the thickness and the size and orientation (short edge first or long edge first) of the recording medium.

If the 5-mm margin at the leading edge of the recording medium 6 is determined to be printable (S6: Yes), the print control section 15 sends the image printing data to the image forming section 1 to form an image with the developing agent (S7). The image is transferred onto the recording medium 6 by the transfer roller in the transfer unit 26 (S8). Next, the recording medium 6 is transported to the fusing section 4 where the image formed is fused onto the recording medium 6 by applying pressure and heat (S9). The recording medium 6 is then ejected into the delivery tray 13 (S10). In this case, since the usual non-printable margin at the leading edge of the recording medium 6 is ignored, marginless printing is possible.

If the 5-mm margin at the leading edge of the recording medium 6 is not determined to be printable (S6: No), the decision module 43 stores the image printing data in a memory (S11) without sending the image printing data to the image forming section 1. The decision module 43 also indicates, by a display or an alarm, that printing is not possible because the recording medium is too thin, and ejects the unprinted recording medium 6 into the delivery tray (S12). The user can then replace the media in the media supply section 2 with thicker media and retry the image formation process.

The memory in which the image printing data are stored and the display or alarm mechanism by which the user is notified that the recording medium is too thin are not shown in the drawings. The alarm may be sent to the external device from which the image data were received.

As described above, information as to the size of the non-printed area at the leading edge of the recording medium is detected from the image printing data, and the thickness of the recording medium is detected. If the non-printed area has less than a predetermined length, a decision is made as to whether or not the recording medium will be able to separate from the fusing roller after fusing of the printed image. This decision is based on the stiffness of the recording medium, as determined from both the thickness of the recording medium and the width of its leading edge. The setting of an unnecessary non-printable margin for thick printing media, and for media transported short edge first, is thereby avoided.

Figure 7:
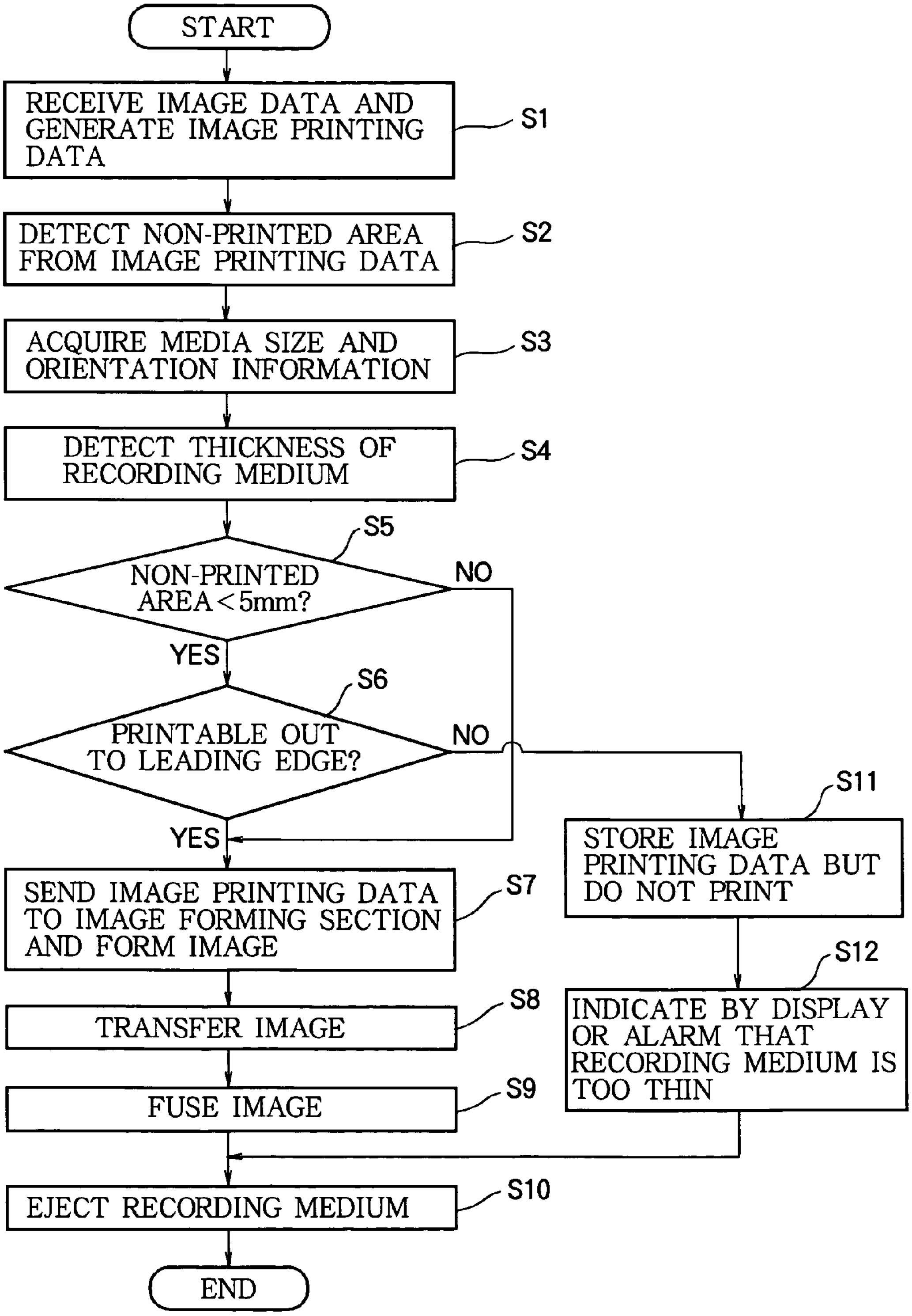
FIG. 7 is a flowchart illustrating the operation of an image forming apparatus according to the first embodiment of the invention.

In FIGS. 6 and 7, the size of the non-printable margin is either 0 mm or 5 mm, depending on the thickness of the recording medium and the width of its leading edge. In a variation of the first embodiment, non-printable margins of different sizes can be set for different combinations of thickness and orientation. After determining the thickness of the recording medium and the width of its leading edge, the decision module 43 can read the necessary length of the non-printable margin from the decision table memory 44 and compare it with the length detected by the margin detector 42 to decide whether to allow printing to proceed.

In this embodiment, since the thickness detector is disposed on the path through which the recording medium is fed from the media supply section into the image forming section by the media transport section, the thickness of the recording medium can be detected from the displacement of a roller in the media transport section caused by the passage of the recording medium. The thickness of the recording medium can therefore be detected automatically and accurately.

Furthermore, the thickness of each sheet of the recording medium supplied is actually measured, so if the thickness of the recording medium varies due to a change in the ambient temperature and humidity, these environmental factors are automatically taken into account in the decision as to whether to allow printing out to the leading edge of the recording medium.

Second Embodiment

When printing is disallowed in the first embodiment because the non-printed area at the leading edge is too small in relation to the thickness and width or orientation of the recording medium, the user is notified by a display or alarm, and the recording medium is ejected without the formation or transfer of an image. In some cases, the user would prefer to have the image trimmed or otherwise modified and printed with a suitable margin at the leading edge of the recording medium. The second embodiment described below meets this need.

In this embodiment, the printing image generation section 41 of the print control section 15 in the first embodiment not only generates image printing data from the image data received but, if necessary, also generates a non-printed margin of a predetermined length at the leading edge of the image in the direction of travel of the recording medium 6. The predetermined length in this embodiment is 5 mm as measured from the leading edge of the recording medium, in order to allow for printing with a high density of developing agent. This is a minimum value; a non-printed margin greater than 5 mm may be formed.

Available methods of forming the non-printed margin include replacing the image printing data in the margin area with blank data, adding blank data at the leading edge of the image so as to shift the image away from the leading edge, and compressing the size of the image so that it is slightly smaller than specified in the image printing data. Compression may be carried out so as to leave a margin only at the leading edge, or to leave margins at all four edges of the recording medium 6.

Other than this difference, the second embodiment is identical to the first embodiment illustrated in FIGS. 1 to 6.

Figure 8:
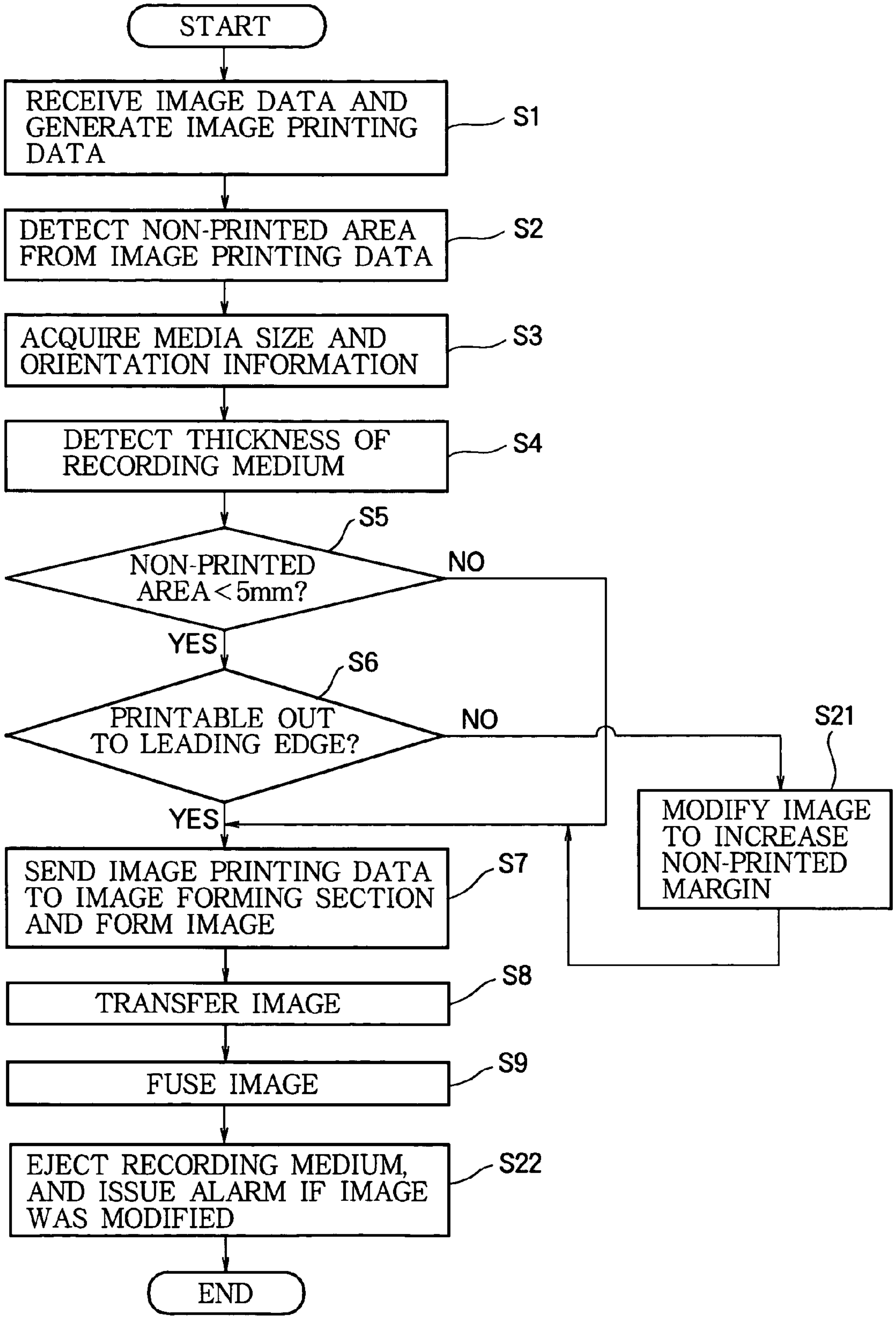
FIG. 8 is a flowchart illustrating the operation of an image forming apparatus according to a second embodiment of the invention.

The operation of the second embodiment will be described with reference to the flowchart in FIG. 8. Steps similar to steps in the operation of the first embodiment shown in FIG. 7 have the same reference characters.

The operations from step S1 to step S6, and the operations when printing is allowed in the 5-mm margin at the leading edge in step S6 (S6: Yes), are similar to the corresponding operations in the first embodiment, so description will be omitted.

When printing is not allowed in the 5-mm margin at the leading edge in step S6 (S6: No), the data generator 41 and the decision module 43 reprocess the data in order to form a non-printed margin having a predetermined size at the leading edge of the recording medium (S21). As noted above, this processing can be carried out by replacing the image printing data in the non-printable margin with blank data, adding a certain amount of blank data at the leading edge of the image printing data, or compressing the size of the image. Next, in step S7, the reprocessed image printing data are sent to the image forming section 1 to form an image with the developing agent.

The operations from step S7 and step S9 are the same as in the first embodiment, so descriptions will be omitted.

In the next step S22, the print control section 15 ejects the recording medium 6 with the printed image into the delivery tray 13. If the image printing data have been altered in step S21, the print control section 15 also issues an alarm informing the user that the data were altered to form a non-printed margin because the recording medium was not thick enough to allow printing in the margin (S22).

Thus, in this embodiment, when the non-printed area at the leading edge of the recording medium has less than a predetermined length, and it is decided that the recording medium might not separate from the fusing roller if the image were to be printed as is, the image printing data are modified to create a non-printed margin of the necessary size. Accordingly, all images can be printed without risk of jamming, but some images have to be modified.

In the embodiments described above, only the margin at the leading edge is considered. In a variation of these embodiments, non-printable margins can be specified on other edges of the recording medium.

The embodiments described above differ from the prior art discussed earlier in that when the thickness and width of the recording media so permit, the non-printable margin at the leading edge of the recording medium is eliminated entirely, allowing marginless printing. This occurs when a Yes decision is made in step S6 in FIGS. 7 and 8. The prior-art apparatus described above always requires at least some non-printed margin, even if the thickness of the recording medium is sufficient for marginless printing.

Although FIG. 1 shows a monochrome image forming apparatus with a single image forming section, the invention is applicable to color image forming apparatus with more than one image forming section, e.g., an apparatus with four image forming sections each using a different color of toner or other developing agent.

The thickness detector need not be disposed in the media transport section. It may be disposed anywhere on the path from the media supply section to the transfer section.

The invention may also be practiced in apparatus lacking a thickness sensor, if the thickness of the recording media is specified in information received from, for example, the external information processing device indicated in FIG. 2.

In the embodiments described above, an image is printed on only a single side of the recording medium. However, the invention is not limited to this arrangement. It is also applicable to image forming apparatus that forms images on both sides of the recording medium.

The image forming apparatus need not be a printer. The invention can also be practiced in facsimile machines, copiers, and combined apparatus including facsimile, copying, and printing functions.

Those skilled in the art will recognize that further variations are possible within the scope of the invention, which is defined in the appended claims.

What is claimed is:

1. An image forming apparatus having:

a print control section for receiving image data and generating image printing data;

a media transport section for transporting a recording medium, the transported recording medium having a leading edge that leads during transport;

an image forming section for forming an image according to the image printing data;

a transfer section for transferring the formed image onto the recording medium;

a fusing section for fusing the transferred image onto the recording medium; and a thickness detector which detects a value of thickness of the recording medium;

wherein the print control section comprises:

a margin detector which determines from the image printing data a length in the transport direction of a non-printed area at the leading edge; and a decision module which decides whether the detected value of thickness in combination with the length detected by the margin detector satisfy a predetermined condition and printing is possible;

wherein the print control section sends the image printing data to the image forming section if the predetermined condition is satisfied and printing is possible, and does not send the image printing data to the image forming section if the predetermined condition is not satisfied and the printing is therefore not possible.

2. The image forming apparatus of claim 1, wherein:

the print control section further comprises a decision table memory storing a table of thickness values of the recording medium and indicating, for each thickness value, whether printing is possible within a predetermined amount of space at the leading edge of the recording medium; and the decision module refers to the decision table memory.

3. The image forming apparatus of claim 2, wherein the recording medium has a width dimension parallel to the leading edge, and the table indicates whether printing is possible within the predetermined amount of space at the leading edge of the recording medium according to both the thickness value and the width dimension of the recording medium.

4. The image forming apparatus of claim 2, wherein the recording medium has a short edge and a long edge, and the table indicates whether printing is possible within the predetermined amount of space at the leading edge of the recording medium according to both the thickness value of the recording medium and whether the recording medium is transported short edge first or long edge first.

5. The image forming apparatus of claim 1, further comprising a media supply section storing the recording medium, wherein the thickness detector is disposed on a recording media path on which the recording medium is transported between the media supply section and the image forming section.

6. The image forming apparatus of claim 5, wherein the thickness detector detects the thickness of the recording medium from motion of a part of the media transport section as the media transport section transports the recording medium.

7. The image forming apparatus of claim 6, wherein the media transport section comprises a mutually facing pair of rollers and the thickness detector detects the thickness of the recording medium from motion of one of the rollers relative to another one of the rollers.

8. The image forming apparatus of claim 1, wherein the print control section retains the image printing data if the predetermined condition is not satisfied.

9. The image forming apparatus of claim 1, wherein the print control section notifies a user of the image forming apparatus, and the media transport section ejects the recording medium from the image forming apparatus without forming an image on the recording medium if the predetermined condition is not satisfied.

10. The image forming apparatus of claim 1, wherein the print control section modifies the image printing data to increase an amount of space without printing at the leading edge of the recording medium to satisfy the predetermined condition and sends the modified image printing data to the image forming section if the predetermined condition is not satisfied.

11. An image forming apparatus having;

a print control section for receiving image data and generating image printing data;

a media transport section for transporting a recording medium, the transported recording medium having a leading edge that leads during transport;

an image forming section for forming an image according to the image printing data;

a transfer section for transferring the formed image onto the recording medium;

a fusing section for fusing the transferred image onto the recording medium; and a thickness detector which detects a thickness dimension of the recording medium;

wherein the print control section comprises:

a decision module which determines a width of the leading edge in a direction orthogonal to a direction in which the media transport section transports the recording medium, and generates decision information based on the width of the leading edge and the detected thickness of the recording medium, the decision information indicating whether a predetermined condition is satisfied and printing is possible at the leading edge of the recording medium; and wherein the print control section does not send the image printing data to the image forming section if the decision information should not be performed determines that the predetermined condition is not satisfied and printing at the leading edge of the recording medium.

12. The image forming apparatus of claim 11, further comprising a media supply section storing the recording medium, wherein the thickness detector is disposed on a recording media path on which the recording medium is transported between the media supply section and the image forming section.

13. The image forming apparatus of claim 12, wherein the thickness detector detects the thickness dimension of the recording medium from motion of a part of the media transport section as the media transport section transports the recording medium.

14. The image forming apparatus of claim 13, wherein the media transport section comprises a mutually facing pair of rollers and the thickness detector detects the thickness dimension of the recording medium from motion of one of the rollers relative to another one of the rollers.

15. The image forming apparatus of claim 11, wherein, when the predetermined condition is unsatisfied, the print control section retains the image printing data.

16. The image forming apparatus of claim 15, wherein when the predetermined condition is unsatisfied, the print control section notifies a user of the image forming apparatus, and the media transport section ejects the recording medium from the image forming apparatus without forming an image on the recording medium.

17. The image forming apparatus of claim 11, wherein when the predetermined condition is unsatisfied, the print control section modifies the image printing data to increase the length of the non-printed area at the leading edge of the recording medium, and sends the modified image printing data to the image forming section.

18. An image forming apparatus having:

a print control section for receiving image data and generating image printing data;

a media transport section for transporting a recording medium, the transported recording medium having a leading edge that leads during transport;

an image forming section for forming an image according to the image printing data;

a transfer section for transferring the formed image onto the recording medium; and a fusing section for fusing the transferred image onto the recording medium; and wherein the print control section comprises:

a margin detector which detects from the image printing data a length in the transport direction of a non-printed area at the leading edge; and a decision module which decides, from at least the length detected by the margin detector, whether a predetermined condition is satisfied and the image printing data are printable; and wherein, if the decision module decides that the predetermined condition is satisfied and the image printing data are printable, the print control section sends the image printing data to the image forming section, and if the decision module decides that the predetermined condition is not satisfied and the image printing data are therefore unprintable, the print control section withholds the image printing data from the image forming section, internally stores the image printing data, and notifies a user of the image forming apparatus.

19. The image forming apparatus of claim 18, wherein, if the decision module decides that the image printing data are unprintable, the media transport section ejects the recording medium from the image forming apparatus without forming an image on the recording medium.

* * * * *